United States Patent [19]
Ihara

[11] Patent Number: 5,999,238
[45] Date of Patent: Dec. 7, 1999

[54] FILTER DEVICE AND BACKLIGHT DEVICE

[75] Inventor: Masahiro Ihara, Kakogawa, Japan

[73] Assignee: Kabushiki Kaisha Toshiba, Kawasaki, Japan

[21] Appl. No.: 08/917,740

[22] Filed: Aug. 27, 1997

[30] Foreign Application Priority Data

Aug. 28, 1996 [JP] Japan ................................. 8-226458

[51] Int. Cl.$^6$ ...................... G02F 1/1333; G02F 1/1335; G02B 5/02

[52] U.S. Cl. .................. 349/58; 349/57; 349/64; 349/65; 359/599

[58] Field of Search ................. 349/58, 64, 65, 349/57; 359/599

[56] References Cited

U.S. PATENT DOCUMENTS

| | | | |
|---|---|---|---|
| 4,799,771 | 1/1989 | Taniguchi | 350/334 |
| 4,963,001 | 10/1990 | Miyajima | 350/334 |
| 5,119,204 | 6/1992 | Hashimoto et al. | 358/254 |
| 5,182,660 | 1/1993 | Tanaka | 359/49 |
| 5,375,005 | 12/1994 | Komano | 359/48 |
| 5,422,751 | 6/1995 | Lewis et al. | 359/83 |
| 5,432,626 | 7/1995 | Sasuga et al. | 359/83 |
| 5,477,423 | 12/1995 | Fredriksz et al. | 362/31 |
| 5,479,285 | 12/1995 | Burke | 359/83 |
| 5,486,942 | 1/1996 | Ichikawa et al. | 359/84 |
| 5,504,605 | 4/1996 | Sakuma et al. | 359/83 |
| 5,640,216 | 6/1997 | Hasegawa et al. | 349/58 |
| 5,668,649 | 9/1997 | Suzuki et al. | 349/42 |
| 5,768,095 | 6/1998 | Nakamura et al. | 349/64 |
| 5,838,412 | 11/1998 | Ueda et al. | 349/150 |

FOREIGN PATENT DOCUMENTS 5-11264  1/1993  Japan .

Primary Examiner—William L. Sikes
Assistant Examiner—Joanne Kim
Attorney, Agent, or Firm—Pillsbury Madison & Sutro

[57] ABSTRACT

A filter device is mounted in a backlight device for illuminating a transmission type liquid crystal display panel from the rear surface side. The filter device includes a sheet having a polygonal filter portion for imparting predetermined optical characteristics to rays of light emerging from the light exit surface of a light guide and a holding portion extending from one side of the filter portion, a frame member having a polygonal opening portion in correspondence with the filter portion to allow light transmitted through the filter portion of the sheet to pass through, and a double-coated tape for bonding the holding portion of the sheet to the frame member.

10 Claims, 3 Drawing Sheets

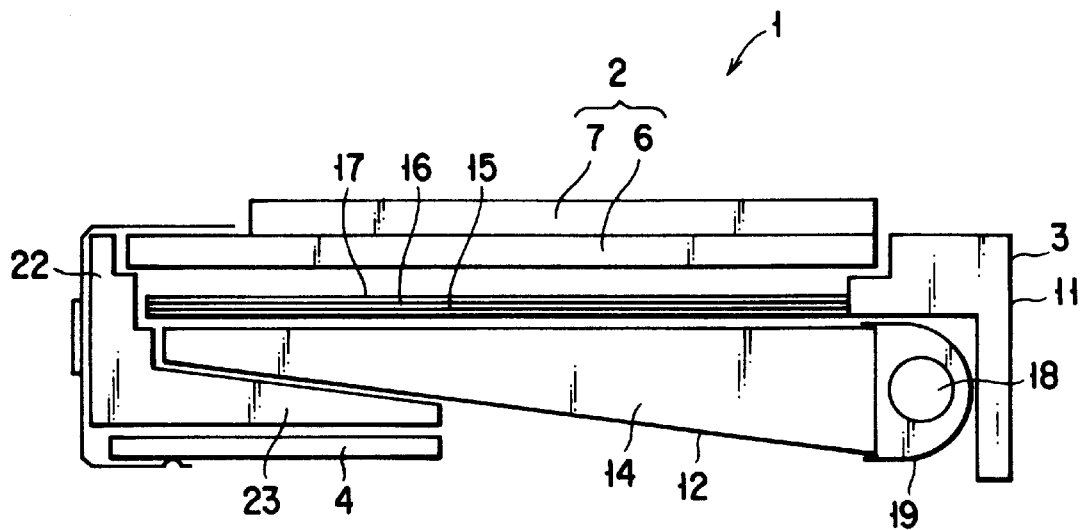
F I G. 2
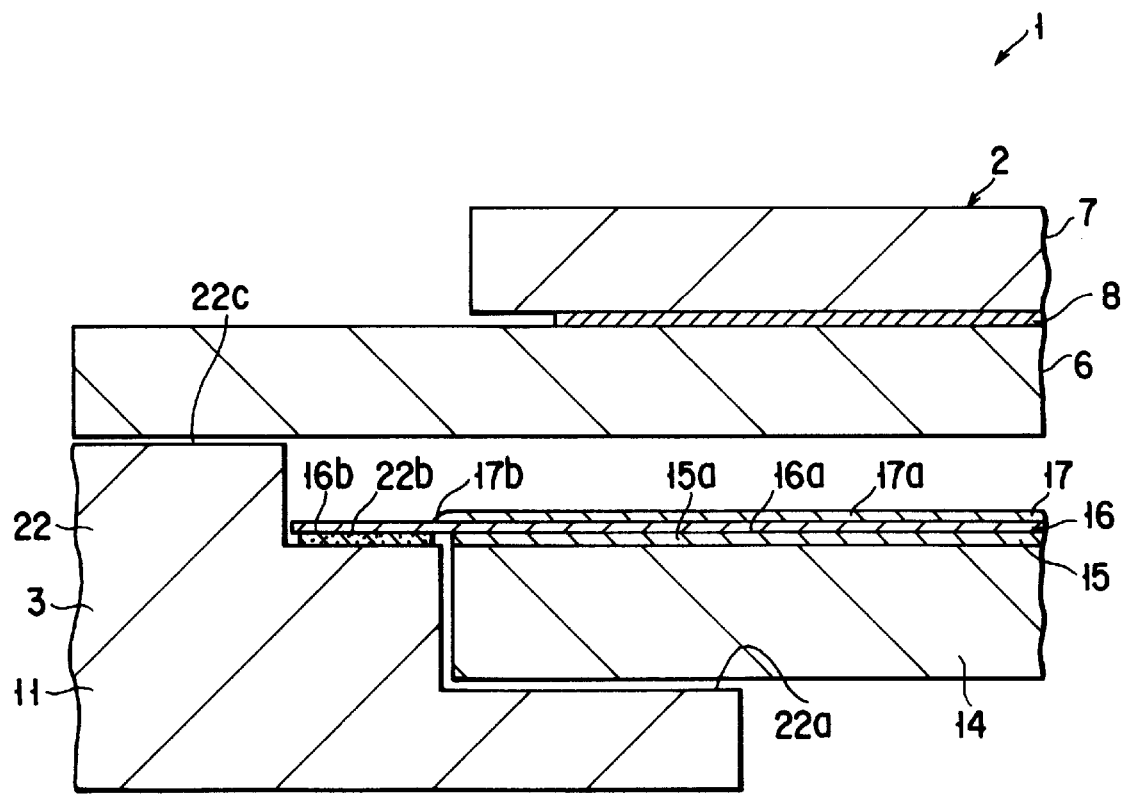
F I G. 3

FILTER DEVICE AND BACKLIGHT DEVICE

BACKGROUND OF THE INVENTION

The present invention relates to a filter device including sheets having predetermined optical characteristics and, more particularly, to a filter device mounted in a backlight device for illuminating a transmission type liquid crystal display panel from the rear surface side.

A filter device including sheets having predetermined optical characteristics has been used. For example, this filter device is applied to a backlight device for illuminating a transmission type liquid crystal display panel from the rear surface side. The filter device applied to such a backlight device includes a diffusion sheet for diffusing light from a light source, a prism sheet for increasing the luminance, and the like.

To clamp and support these sheets, this filter device also includes a frame member having a frame portion formed in correspondence with the peripheral portion of a sheet and a side cover constituted by press members attached to the respective sides of the frame portion. The sheet is attached to the frame member such that two opposing sides of the sheet are clamped between the frame portion and the side cover.

In the filter device designed to press two opposing sides of a sheet against the frame portion of the frame member by using the side cover as described above, the sheet must be accurately positioned with respect to the frame portion. In addition, the sheet must be kept stretched. If these requirements are not satisfied, the sheet crinkles, resulting in a deterioration in optical characteristics. In addition, when a plurality of sheets are stacked and attached to the frame member, since the sheets must be visually positioned with high precision, it takes much time and effort to accurately position the respective sheets. It is difficult to keep the respective sheet stretched. Furthermore, when a sheet needs to be replaced, a cumbersome operation which may damage the sheet is required. As a result, the working load on the operator may increase. In addition, it is difficult to reduce the number of parts and the manufacturing cost.

BRIEF SUMMARY OF THE INVENTION

The present invention has been made to solve the above problems, and has as its object to provide a filter device which can easily position and hold sheets on a frame member without degrading the optical characteristics, and allows a reduction in manufacturing cost, and a backlight device including the filter device.

According to the present invention, there is provided a filter device comprising:

a sheet having a polygonal filter portion having optical characteristics and a holding portion extending from one side of the filter portion;

a frame member having a polygonal opening portion formed in correspondence with the filter portion to allow light transmitted through the filter portion to pass through; and fixing means for fixing the frame member to the holding portion.

According to the filter device of the present invention, the sheet includes a filter portion having optical characteristics and a holding portion formed on one side of the filter portion. This sheet is mounted on the frame member by fixing the holding portion to the frame member with the fixing means. With this structure, the number of parts and the cost can be reduced as compared with the structure in which the respective sides of a sheet are pressed by the side cover. In addition, with this structure, the sheet can be easily placed along the frame member without wrinkling it, and the sheet can be easily replaced.

When a plurality of sheets are to be stacked on the frame member, the positions of the holding portions of the respective sheets are shifted from each other, and the respective sheets are fixed to the frame member by using the fixing means. With this structure, an increase in the thickness of each portion corresponding to the fixing means can be suppressed, and foreign substances between the respective sheets can be easily removed. In addition, the holding portion of the preceding sheet fixed to the frame member is used as a positioning reference to position the holding portion of the next sheet to be fixed, thereby facilitating positioning of the respective sheets. Even if a plurality of sheets are to be stacked, a deterioration in operation efficiency can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a sectional view schematically showing a liquid crystal display device including the filter device in FIG. 1;

FIG. 3 is a partially enlarged sectional view of the liquid crystal display device in FIG. 2;

DETAILED DESCRIPTION OF THE INVENTION

Figure 1:
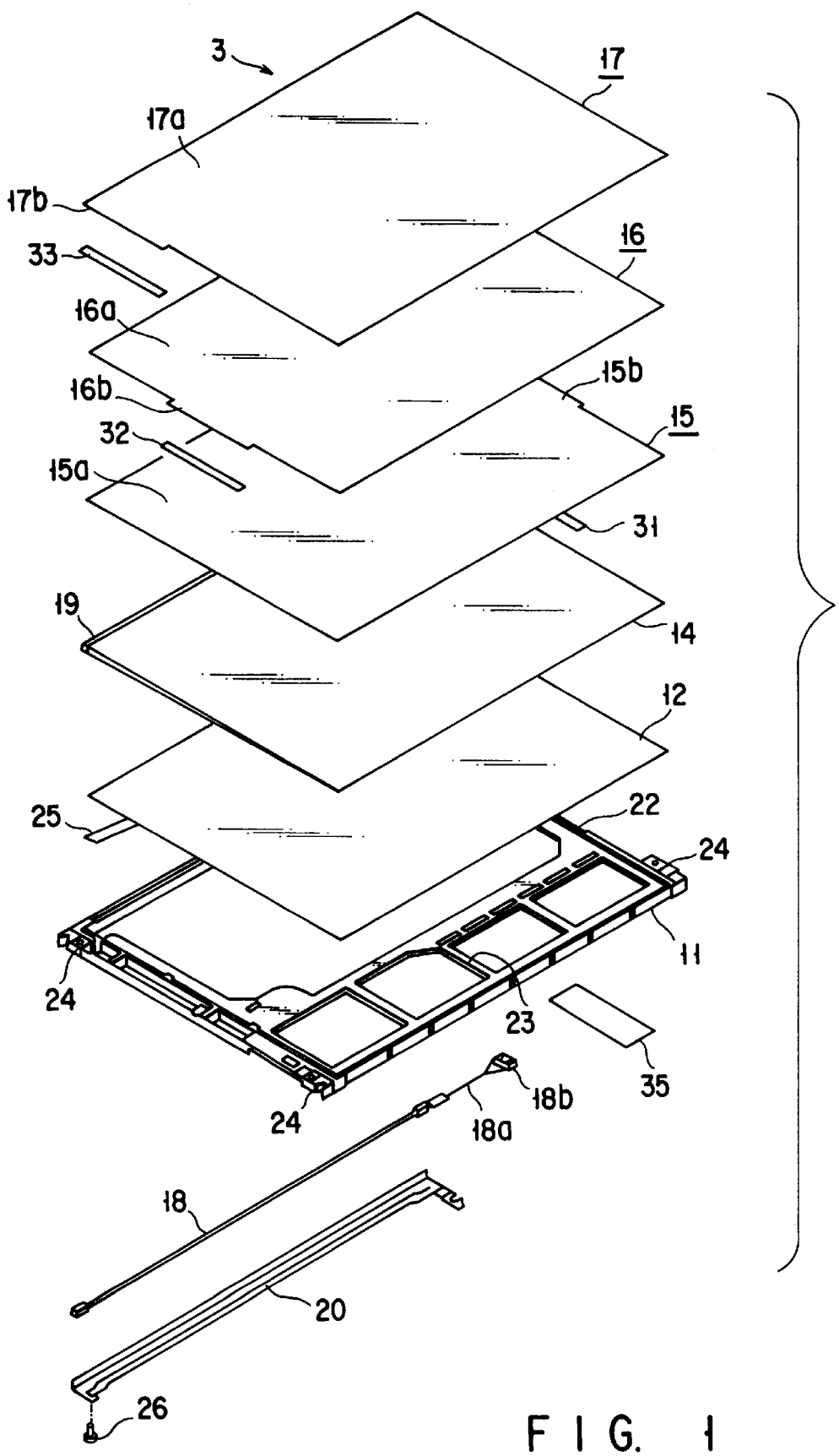
FIG. 1 is an exploded perspective view of a backlight device including a filter device according to an embodiment of the present invention.

A filter device of the present invention and a backlight device having the filter device will be described below with reference to the accompanying drawing.

For example, a backlight device of the present invention is mounted as an illumination device in a liquid crystal display device to illuminate the transmission type liquid crystal display panel from the rear surface side.

More specifically, as shown in FIGS. 2 and 3, a liquid crystal device 1 includes a liquid crystal display panel 2 as a display device, a backlight device 3 as an illumination device, and a circuit board 4 as a driving device. In the following description, the display surface side, i.e., the front surface side, of the liquid crystal display panel 2 is considered as the upper side.

The liquid crystal display panel 2 is called a liquid crystal cell, a liquid crystal display element, or a liquid crystal display device. The liquid crystal display panel 2 includes a light-transmitting array substrate 6, a counter substrate 7, and a liquid crystal layer 8 formed by injecting a liquid crystal material between the substrates 6 and 7.

The array substrate 6 includes a plurality of scanning lines arranged on a transparent glass plate in the row direction, a plurality of signal lines arranged in the column direction, thin-film transistors, i.e., TFTs, as switching elements, arranged near the intersections of the scanning lines and the signal lines, and pixel electrodes, each formed from a transparent conductive member and connected to a corresponding TFT. The counter substrate 7 is placed above the array substrate 6 to oppose it. For example, the counter substrate 7 includes red (R), green (G), and blue (B) filters arranged to oppose the respective pixels when the counter substrate 7 is placed to oppose the array substrate 6, and a counterelectrode placed to oppose the pixel electrodes.

The liquid crystal display panel 2 has the circuit board 4 electrically connected to the array substrate 6 to drive the respective TFTs. The circuit board 4 drives the TFTs arranged in correspondence with the respective pixels to generate potential differences between the pixel electrodes and the counterelectrode. The amount of light transmitted through the liquid crystal display panel 2 is controlled by applying these potential differences to the liquid crystal material placed between the array substrate 6 and the counter substrate 7. As a result, an image is displayed.

The backlight device 3 is placed on the lower surface side, i.e., the rear surface side, of the liquid crystal display panel 2 to illuminate the liquid crystal display panel 2.

As shown in FIGS. 1 to 3, the backlight device 3 has a frame 11 as a frame member which is integrally molded with a synthetic resin, i.e., a plastic material. The backlight device 3 includes a reflecting sheet 12, a light guide 14, a diffusion sheet 15 as a sheet, a first prism sheet 16 as a sheet, and a second prism sheet 17 as a sheet, which are sequentially stacked on the frame 11. A lamp 18, a lamp reflector 19, and a lamp cover 20 are attached to one side portion of the light guide 14 of the backlight device 3. A light source portion includes the reflecting sheet 12, the light guide 14, the lamp 18, the lamp reflector 19, and the lamp cover 20.

The frame 11 is also called a plastic mold, and has a frame portion 22 formed in a substantially rectangular frame-like shape. The frame 11 also includes a circuit board mounting portion 23 formed inside the frame portion 22 to mount the circuit board 4, and screw fastening portions 24 formed outside the frame portion 22 near the four corners of the frame portion 22 to allow setting screws to be fastened. As shown in FIGS. 2 and 3, the inner peripheral portion of the frame portion 22 is formed into steps to open wider stepwise toward the upper side.

As shown in FIG. 3, a light guide receiving portion 22a for receiving the light guide 14 having the reflecting sheet 12 is formed on a portion, of the inner peripheral portion of the frame portion 22, which corresponds to the lowermost step. A sheet receiving portion 22b for receiving the diffusion sheet 15, the first prism sheet 16, and the second prism sheet 17 is formed on a portion, of the inner peripheral portion of the frame portion 22, which is located above the light guide receiving portion 22a and has a size larger than the surface size of the light guide 14. A liquid crystal display panel receiving portion 22c for receiving the liquid crystal display panel 2 is formed on a portion, of the inner peripheral portion of the frame portion 22, which is located above the sheet receiving portion 22b and has a size larger than the surface size of each sheet.

The reflecting sheet 12 whose upper surface serves as a reflecting surface is placed and bonded on the light guide receiving portion 22a of the frame 11 with a double-coated tape 25. The light guide 14 is placed on the reflecting sheet 12. The light guide 14 is also called a light guide plate, having an upper surface serving as a horizontal light exit surface and an inclined lower surface. That is, the light guide 14 has a substantially wedge-like shape gradually decreasing in thickness from one end portion to the other end portion.

The lamp 18 is placed along one end portion of the light guide 14. The lamp reflector 19 having an output opening formed on the light guide 14 side is mounted to cover the lamp 18. In addition, the lamp cover 20 covering the lamp 18 and the lamp reflector 19 is fixed to the screw fastening portion 24 with screws.

The lamp 18 is a small-diameter cold cathode as a fluorescent lamp. A terminal portion 18b is connected to one end portion of the lamp 18 through a lead wire 18a. Silicone rubber holders are attached to the two end portions of the lamp 18. Rays of light emitted from the lamp 18 are incident from one end portion of the light guide 14 and repeatedly reflected inside the light guide 14 and by the reflecting surface of the reflecting sheet 12. Thereafter, the rays of light emerge upward from the upper surface of the light guide 14. That is, the light guide 14 causes the rays of light emitted from the fluorescent lamp as a linear light source to emerge from the light exit surface almost uniformly, thereby converting the linear light source into a surface light source.

The diffusion sheet 15, the first prism sheet 16, and the second prism sheet 17 are sequentially stacked on the upper surface of the light guide 14. These sheets 15, 16, and 17 respectively include flat polygonal (e.g., rectangular) filter portions 15a, 16a, and 17a and lug portions, i.e., holding portions 15b, 16b, and 17b, each extending from a portion of one side of a corresponding one of the filter portions 15a, 16a, and 17a. These filter and holding portions are integrally formed.

The filter portions 15a, 16a, and 17a respectively have predetermined optical characteristics. More specifically, the filter portion 15a of the diffusion sheet 15 is also called a wave sheet, which is formed as a milky white member and almost uniformly diffuses incident rays of light. Each of the filter portions 16a and 17a of the first and second prism sheets 16 and 17 has a plurality of minute prisms, each having a vertical angle of 90° to 100°, on the entire upper surface formed from a plastic film such as a polycarbonate film. The respective prisms extend along one direction and formed at a pitch of several ten to several hundred $\mu$m. The filter portions of these prism sheets refract light incident from the lower surface side, i.e., the flat surface side, and output the light upward as diffused light with a small exit angle of ±40° with respect to the normal. By forming diffused light with such a small exit angle, the luminance is increased when viewed from the upper surface side, i.e., the front surface side. The filter portion 16a of the first prism sheet 16 and the filter portion 17a of the second prism sheet 17 are arranged such that the extending directions of the prisms become perpendicular to each other, i.e., the respective prisms form vertical and horizontal stripes.

The frame 11 has an opening portion formed in correspondence with the shape of the filter portion of each sheet to guide light emerging to have a planar section from the light guide 14 toward the filter portion of each sheet.

Figure 4:
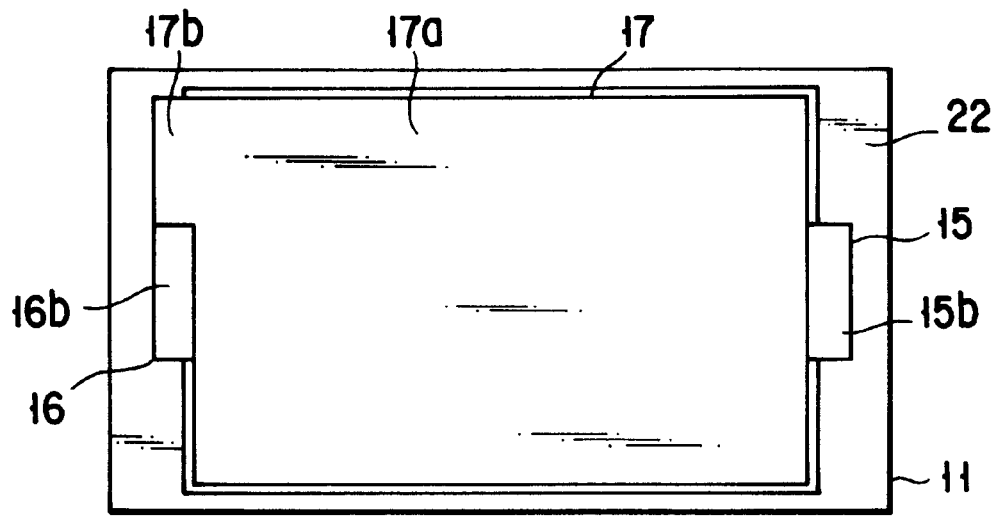
FIG. 4 is a plan view of the filter device in FIG. 1.

As shown in FIGS. 1 and 4, the positions of the holding portions 15b, 16b, and 17b of the sheets 15, 16, and 17 are shifted from each other in the horizontal direction such that the holding portions 15b, 16b, and 17b do not overlap each other vertically. More specifically, the holding portion 15b of the diffusion sheet 15 extends from the middle portion of one end portion of the sheet. The holding portion 16b of the first prism sheet 16 extends from the middle portion of the other end portion on the opposite side to the holding portion 15b of the diffusion sheet 15. The holding portion 17b of the second prism sheet 17 extends from one side portion of the other end portion on the same side as that of the holding portion 16b of the first prism sheet 16.

Each of the sheets 15, 16, and 17 is fixed to the frame portion 22 of the frame 11 with a double-coated tape as a fixing device for fixing each sheet to the sheet receiving portion 22b formed on a portion of the inner peripheral portion of the frame portion 22 of the frame 11.

The diffusion sheet 15 is placed such that the holding portion 15b is positioned in almost the middle of the sheet receiving portion 22b on one side portion of the frame portion 22. The diffusion sheet 15 is fixed to the frame 11 by bonding the holding portion 15b of the diffusion sheet 15 on the sheet receiving portion 22b of the frame portion 22 with a doublecoated tape 31.

The first prism sheet 16 is placed such that the holding portion 16b is positioned in almost the middle of the sheet receiving portion 22b on the other side portion of the frame portion 22, i.e., the side portion on the opposite side to one side portion on which the holding portion 15b of the diffusion sheet 15 is placed. The first prism sheet 16 is fixed to the frame 11 by bonding the holding portion 16b of the first prism sheet 16 on the sheet receiving portion 22b of the frame portion 22 with a double-coated tape 32.

The second prism sheet 17 is placed such that the holding portion 17b is positioned in the sheet receiving portion 22b on the other side portion of the frame portion 22. The holding portion 17b of the second prism sheet 17 is adjacent to the holding portion 16b of the first prism sheet 16. The second prism sheet 17 is fixed to the frame 11 by bonding the holding portion 17b of the second prism sheet 17 on the sheet receiving portion 22b of the frame portion 22 with a double-coated tape 33.

After a protective sheet is placed above the sheets 15, 16, and 17, as needed, the liquid crystal display panel 2 is placed on the liquid crystal display panel receiving portion 22c of the frame portion 22 above the sheets 15, 16, and 17, as shown in FIGS. 2 and 3. The circuit board 4 electrically connected to the liquid crystal display panel 2 is placed below the circuit board mounting portion 23 and is fixed with a screw 26 or the like, thereby assembling the liquid crystal device 1. In the assembled state shown in FIG. 2, the sheets 15, 16, and 17 are held between the upper surface, i.e., the light exit surface, of the light guide 14 and the lower surface of the liquid crystal display panel 2.

In the liquid crystal display device in this embodiment, when the lamp 18 is turned on, light emerges from the light exit surface of the light guide 14 to have a planar section, and the light passing through the opening portion of the frame 11 is diffused by the diffusion sheet 15. The output direction of the diffused light is adjusted by the first and second prism sheets 16 and 17 to illuminate the liquid crystal display panel 2 from the rear surface side. The amount of light transmitted through the liquid crystal display panel 2 is controlled on the basis of a control signal from the circuit board 4, thereby displaying an image.

A disposal label 35 indicating a disposal method or the like is stuck on the liquid crystal device 1 at a predetermined position.

As shown in FIG. 4, in the above liquid crystal display device, the holding portions of the respective sheets are attached to opposing two sides of the frame portion 22 of the frame 11. However, the positions where the holding portions are attached are not limited to those in this embodiment. The holding portions of the respective sheets can be stably fixed by using wide portions of the frame portion 22. If, therefore, the respective sides of the frame portion are sufficiently wide, the holding portions of the respective sheets may be attached to the respective sides of the frame portion 22. In the case shown in FIG. 4, the short sides of the frame are formed to be sufficiently wide, but the long sides of the frame are formed to be narrow with a reduction in the frame width. For this reason, the holding portions of the sheets are formed in correspondence with the short sides of the frame and are attached to the short sides, thereby stably fixing the sheets to the frame.

Figure 5:
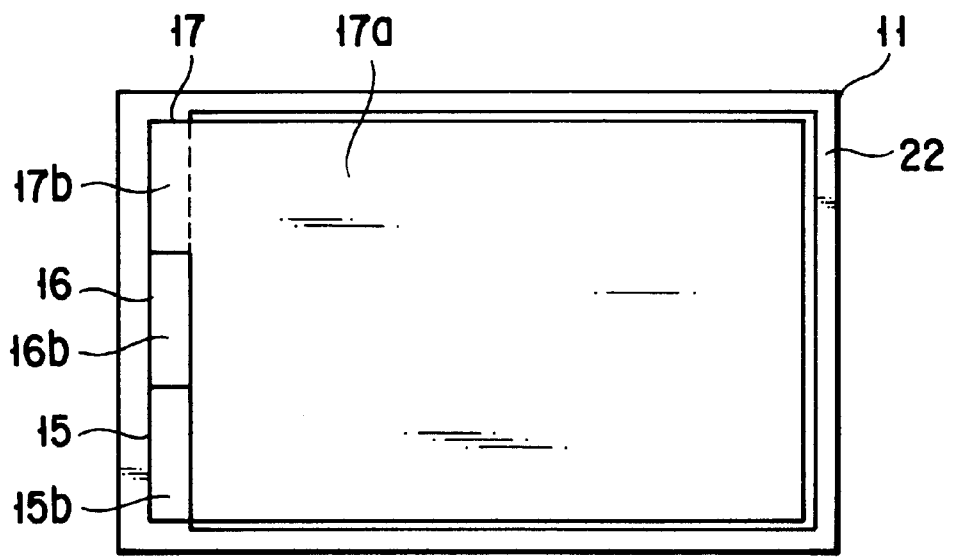
FIG. 5 is a plan view of a filter device according to another embodiment of the present invention.

In addition, as shown in FIG. 5, the holding portions of the respective sheets may be formed to be adjacent to each other in accordance with the order in which the sheets are stacked. More specifically, when these sheets are be mounted on the frame portion 22 of the frame 11, the respective sheets are visually positioned and are bonded to the frame 11 with double-coated tapes. In this case, if the holding portions of the sheets are formed on one side to be adjacent to each other when the sheets are stacked on each other, the holding portion of a sheet which has already been stuck to the frame can be used as a reference position for positioning.

For example, the holding portion of the lowermost sheet of the sheets to be stacked on each other, i.e., the holding portion 15b of the diffusion sheet 15 stuck to the frame 11 first, is formed in correspondence with one short side of the frame 11, and fixed to the frame 11 with a double-coated tape. The holding portion 16b of the first prism sheet 16 to be stacked on the diffusion sheet 15 is formed to be adjacent to the holding portion 15b of the diffusion sheet 15. The holding portion 16b is fixed to the frame 11 with a double-coated tape to be adjacent to the holding portion 15b by using the holding portion 15b of the diffusion sheet 15, which has already been fixed, as a positioning reference. The holding portion 17b of the second prism sheet 17 to be stacked on the first prism sheet 16 is formed to be adjacent to the holding portion 16b of the first prism sheet 16. The holding portion 17b is fixed to the frame 11 with a double-coated tape to be adjacent to the holding portion 16b by using the holding portion 16b of the first prism sheet 16 as a positioning reference.

By forming the holding portions of the respective sheets in this manner, each holding portion can be used as a reference for positioning each sheet on the frame. In addition, since the holding portions of all the sheets are arranged on one side, only one side of the frame is required to be formed into a wide side on which the holding portions are arranged. Since the three remaining sides can be formed narrow, the frame width of the liquid crystal display device can be further decreased.

According to this embodiment, the sheets 15, 16, and 17 of the backlight device 3 respectively include the filter portions 15a, 16a, and 17a respectively having predetermined optical characteristics and the holding portions 15b, 16b, and 17b, each formed on one side of a corresponding filter portion. These holding portions 15b, 16b, and 17b are fixed to the frame 11 by using the double-coated tapes 31, 32, and 33. Since only one side of each of the sheets 15, 16, and 17 is fixed in this manner, the occurrence of crinkles, i.e., wrinkles, of the sheets, which are likely to occur in a so-called reliability test or the like in a device in which a plurality of sides of each sheet are fixed, can be suppressed, and the respective sheets can be easily and smoothly placed along the light guide 14. With this effect, degradation in optical characteristics, e.g., luminance irregularity, which is caused by crinkles of the respective sheets 15, 16, and 17, can be suppressed, thus improving the optical characteristic reliability.

According to this embodiment, since only one side of each of the sheets 15, 16, and 17 is fixed, foreign substances such as dust between the sheets 15, 16, and 17 can be easily removed, and the sheets 15, 16, and 17 can be easily replaced. Therefore, when the sheets 15, 16, and 17 are replaced, damage to the sheets 15, 16, and 17 can be suppressed, and the maintenance of the prism sheets 16 and 17, which are easily damaged, is facilitated, as compared with a structure in which the sheets are fixed by using a side cover or the like.

According to this embodiment, the number of parts and the manufacturing cost can be reduced as compared with the structure in which the sheets are fixed by using a side cover or the like.

In addition, since the holding portions 15b, 16b, and 17b of the sheets 15, 16, and 17 are formed at different positions in the horizontal direction and do not overlap each other vertically, the holding portions 15b, 16b, and 17b are not stacked on each other. This structure prevents only the portions corresponding to the holding portions 15b, 16b, and 17b from increasing in thickness, and can realize a uniform thickness.

In the above embodiment, as fixing device, the double-coated tapes 31, 32, and 33 are used. However, sticking portions may b e formed on the respective sheets by using an adhesive.

In the above embodiment, one diffusion sheet 15 and two prism sheets 16 and 17 are stacked. However, various sheets can be used, and only one sheet or two or more sheets may be stacked by using sheets having various optical characteristics.

In the above embodiment, the lamp 18 is placed along one side of the light guide 14. However, for example, lamps 18 may be placed along two sides of the light guide 14.

As has been described above, according to the filter device of the present invention and the backlight device having the filter device, since the holding portion extends from one side of the filter portion of each sheet, and is bonded to the frame member with the double-coated tape, the number of parts and the manufacturing cost can be reduced. In addition, the sheets can be easily arranged along the frame member without any crinkles, and the optical characteristics can be improved. Furthermore, the sheets can be easily replaced.

In addition, a plurality of sheets are stacked on each other such that the positions of the holding portions of the respective sheets are shifted from each other, and the holding portions are bonded to the frame member with the double-coated tapes. With this structure, an increase in the thickness of each portion to which the double-coated tape is stuck can be suppressed to make the thicknesses of the sheets stacked on each other uniform. Furthermore, foreign substances between the respective sheets can be easily removed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A filter device comprising:

a plurality of sheets each having a polygonal filter portion having optical characteristics and a holding portion extending from one side of the filter portion;

a frame member having a polygonal opening portion formed in correspondence with the filter portion of each of said sheets to allow light transmitted through the filter portion of each of said sheets to pass through; and fixing means for fixing the holding portion of each of said sheets to said frame member;

wherein the holding portions of the respective sheets are arranged in different positions when the sheets are stacked, and are fixed to said frame member by using said fixing means.

2. A device according to claim 1, wherein the holding portions of the respective sheets are arranged next to each other.

3. A device according to claim 2, wherein the holding portions of the respective sheets are arranged at adjacent positions in an order said sheets are stacked.

4. A device according to claim 1 wherein said fixing means is adhesive tape.

5. A device according to claim 1 wherein said plurality of sheets comprise a diffusion sheet for diffusing light and a prism sheet for converging light.

6. A backlight device for illuminating a transmission type liquid crystal display panel, comprising:

a light source portion which has a light exit surface from which light emerges and illuminates said transmission type liquid crystal display panel with the light emerging from the light exit surface;

a plurality of sheets inserted between said light source portion and said liquid crystal display panel and each including a polygonal filter portion for imparting predetermined optical characteristics to light emerging from the light exit surface of said light source portion and a holding portion extending from one side of the filter portion;

a frame member having a polygonal opening portion formed in correspondence with the filter portion of each of said sheets to allow light transmitted through the filter portion of each of said sheets to pass through; and fixing means for fixing the holding portion of each of said sheets to said frame member, wherein the holding portions of the respective sheets are arranged in different positions when the sheets are stacked, and are fixed to said frame member by using said fixing means.

7. A device according to claim 6, wherein the holding portions of the respective sheets are arranged next to each other.

8. A device according to claim 7, wherein the holding portions of the respective sheets are arranged at adjacent positions in an order said sheets are stacked.

9. A device according to claim 6 wherein said fixing means is adhesive tape.

10. A device according to claim 6 wherein said plurality of sheets comprise a diffusion sheet for diffusing light and a prism sheet for converging light.

* * * * *